Oct. 28, 1924.
C. E. WICKERS
1,513,439
METHOD OF MAKING ERASERS
Filed May 31, 1923
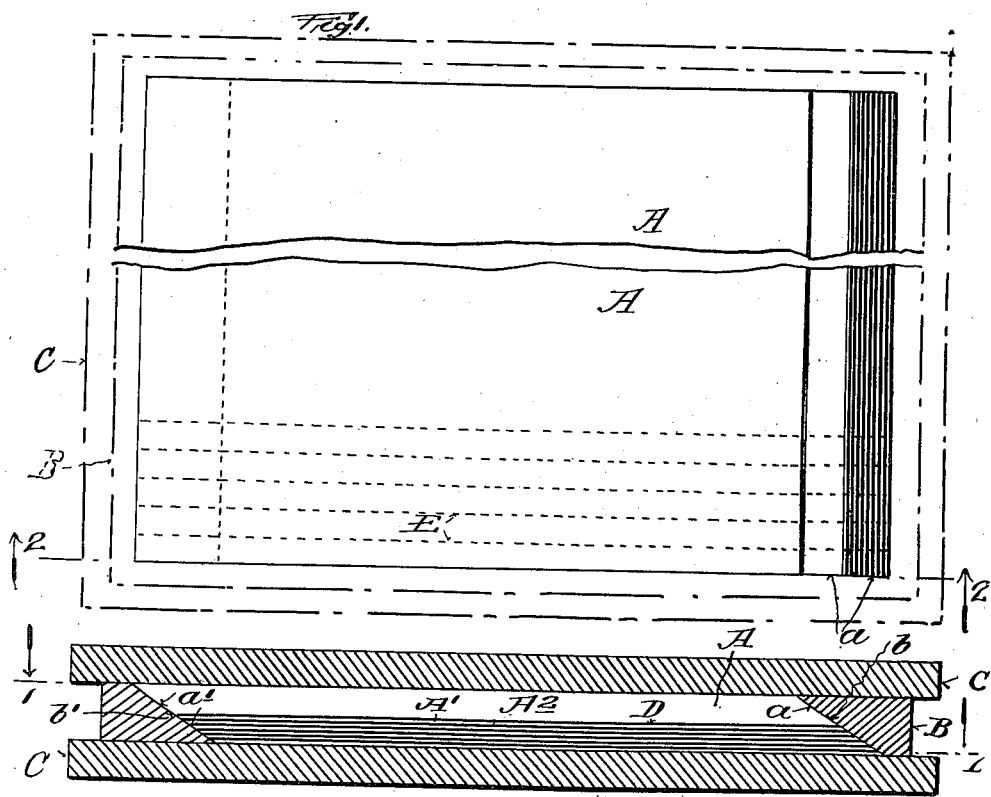
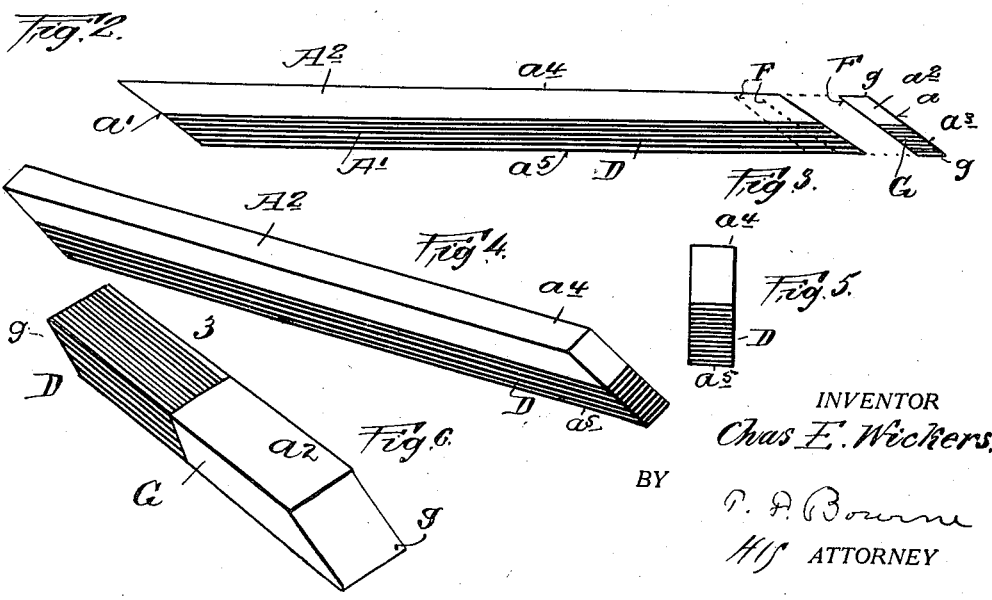
INVENTOR
Chas E. Wickers.
BY
P. A. Bourne
HIS ATTORNEY Patented Oct. 28, 1924.

1,513,439

UNITED STATES PATENT OFFICE.

CHARLES EDWARD WICKERS, OF PASSAIC, NEW JERSEY.

METHOD OF MAKING ERASERS.

Application filed May 31, 1923. Serial No. 642,512.

*To all whom it may concern:*

Be it known that I, CHARLES EDWARD WICKERS, a citizen of the United States, and resident of Passaic, in the county of Passaic and State of New Jersey, have invented certain new and useful Improvements in Methods of Making Erasers, of which the following is a specification The object of my invention is to make erasers cheaply and accurately from relatively large sheets of stock, and has particular reference to making erasers having portions commonly called "ink" and "pencil" for respectively erasing ink and pencil marks.

In carrying out my invention I provide sheets of rubber stock of suitable dimensions having edges on opposite sides beveled at substantially the same angle to the surfaces of the sheet; I cut said sheets crosswise between the beveled edges to produce strips of stock having beveled ends and the width of erasers to be produced, and I cut said strips crosswise in spaced relation at such an angle to their longitudinal axes as will produce erasers having the desired thickness, the last named cuts being at an angle to opposite longitudinal edges of such strips, whereby the said opposite edges of the strips will produce beveled ends on the finished erasers.

In the accompanying drawings I have illustrated various steps in carrying out my invention, wherein—

Fig. 1 is a plan view illustrating a step in making the sheet of stock for the erasers;

Fig. 2 is a section on the plane of line 2, 2, in Fig. 1;

Fig. 3 is a side view of one of the strips cut from the stock, illustrating an eraser cut from the strip;

Fig. 4 is a perspective view of said strip;

Fig. 5 is an end view of Fig. 4; and

Fig. 6 is a perspective view of a finished eraser.

Similar numerals of reference indicate corresponding parts in the several views.

The sheet of rubber compound suitable for erasers is indicated at A from which erasers are to be made, the opposite edges $a$, $a'$ of which stock are beveled in substantially parallel planes so that the edge $a$ is exposed outwardly and the edge $a'$ extends under the sheet. In order to vulcanize the uncured or unvulcanized compound so that the edges $a$, $a'$ will retain the proper angles when the rubber is cured or vulcanized I provide a frame B, of the size and dimensions of the finished sheet, having an edge $b$ along one side beveled or inclined under the side wall of the frame to correspond with the outer beveled edge $a$ of the uncured stock and the finished sheet, the opposite side wall of the frame being beveled on its upper surface at $b'$ to correspond to the beveled under surface $a'$ of the sheet. Such frame B is placed on a plate C, the uncured sheet having its beveled edges $a$, $a'$ is placed upon plate C within frame B, as shown in Fig. 2, and another plate C is placed over said frame and sheet. Such plates, frames and sheets may be placed in a vulcanizing press and subjected to desired compression during vulcanization of the sheets, such pressure being applied in a direction normal to the surfaces of the sheets, hence normal to the point between sheets of compound, which makes a very firm and uniform adhesion of the sheets. The frame B may be of any suitable depth and of any desired area to produce the vulcanized sheets of the required dimensions from which the erasers are to be cut.

When it is desired to produce erasers having so-called "pencil" portions $a^2$ at one end and "ink" portions $a^3$ at the opposite end I place within frame B one or more layers of uncured rubber compound A' suitable for the "ink" erasers, and on the same I lay one or more layers of uncured rubber compound $A^2$ suitable for the "pencil" eraser, or vice versa, which layers are in contact with one another and have the beveled edges $a$, $a'$ at opposite sides, to form the vulcanized sheets. In Fig. 1 the frame B is shown in dotted lines in rectangular form and the sides of said frame which are at right angles to the beveled edges $b$, $b'$ are rectangular to the plates C so that the corresponding sides of the vulcanized sheet when removed from the frame will be at right angles to the flat top and bottom surfaces of the sheet, the other sides being beveled at $a$, $a'$. If it is desired to produce "pencil" or "ink" erasers instead of the combination of "pencil" and "ink" erasers the corresponding compound will be placed in the frame B.

When the layers of rubber compound A', $A^2$ have been cured or vulcanized they will be united in a homogeneous mass, and will be of different coloring for the "ink" and "pencil" portions when the ingredients including the erasive material incorporated in the uncured rubber compound for the "ink" eraser is of a different color from the compound for the "pencil" eraser, as indicated by the parallel lines at D.

When the sheets having the beveled edges $a$, $a'$ have been vulcanized or cured they are removed from the frame B and are cut crosswise between the beveled edges $a$, $a'$ along the lines indicated at E, in such spaced relation as to produce strips having the desired width for the erasers, such strips being indicated in Figs. 3 and 4 with the beveled edges $a$, $a'$ disposed at the ends of the strips similarly to their relation in the uncut sheet. The strips are then severed crosswise between their parallel longitudinal edges at $a^4$, $a^5$, along lines indicated at F, (Fig. 3), to produce the erasers G, one of which is indicated at the right hand side of Fig. 3 after having been cut from the strip and moved to one side. The cuts F along strip D are spaced apart to produce the desired thickness of the finished erasers, which will be of rectangular cross section with beveled ends $g$ parallel to one another but at an angle to the adjacent surfaces of the eraser. The beveled ends $g$ of the erasers result from the parallel edges of $a^4$, $a^5$, of the strip. The length of the finished erasers is determined by the angle at which the cuts F are made in the strip between its parallel edges $a^4$, $a^5$, since the greater the angle of the cuts F with respect to said edges the greater will be the length of the finished erasers, and conversely. By having the cross cuts at F parallel with the beveled edges $a$, $a'$ of the original sheet the desired shape of erasers is produced with a minimum of loss of stock.

By means of my improvement I am enabled to produce erasers of the class specified cheaply and expeditiously, which erasers will be of uniform dimensions and appearance, and in the production of the "ink" and "pencil" combination erasers the line of division between the ink and pencil parts will be uniform.

Having now described my invention what I claim is:

1. The method of making erasers consisting in forming a sheet of vulcanized rubber compound having opposite edges beveled in substantially parallel planes, cutting said sheet between said beveled edges to form strips having beveled ends, and severing said strips transversely in lines at an angle to opposite edges of said strip.

2. The method of making erasers consisting in forming a sheet of vulcanized rubber compound having opposite edges beveled in substantially parallel planes, cutting said sheet between said beveled edges to form strips having beveled ends, and severing said strips transversely in lines substantially parallel to the beveled ends.

3. The method of making erasers comprising ink and pencil compound consisting in superimposing layers of uncured ink and pencil rubber compound to produce a sheet, providing opposite sides of such sheet with beveled edges on substantially corresponding planes, vulcanizing the sheets together, cutting the sheet crosswise through the ink and pencil compound between said beveled edges to produce strips having beveled ends, and cutting said strips transversely parallel to said beveled edges, providing erasers having beveled ends.

CHARLES EDWARD WICKERS.